United States Patent
Peters et al.

(10) Patent No.: US 7,801,804 B2
(45) Date of Patent: Sep. 21, 2010

(54) CONVEX PARIMUTUEL CONTINGENT CLAIM MARKET MECHANISM

(75) Inventors: Mark E. Peters, San Francisco, CA (US); Yinyu Ye, Menlo Park, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 469 days.

(21) Appl. No.: 11/974,169

(22) Filed: Oct. 10, 2007

(65) Prior Publication Data

US 2009/0099955 A1    Apr. 16, 2009

Related U.S. Application Data

(60) Provisional application No. 60/815,661, filed on Oct. 12, 2006.

(51) Int. Cl.
*G06F 17/10* (2006.01)
(52) U.S. Cl. .................... 705/37; 705/35; 705/36 R
(58) Field of Classification Search ............... 705/35, 705/36 R, 37
See application file for complete search history.

(56) References Cited

OTHER PUBLICATIONS

Lange and Economides, in "A parimutuel market microstructure for contingent claims," European Financial Management, 11(1):25-49, 2005.
Yang and Ng, "Qualified-Bound-Pricing methods for combinatorial contract auctions," 2003.
Y. Ye, "A path to the Arrow-Debreu competitive market equilibrium," Mathematical Programming, 2005.

*Primary Examiner*—Daniel S Felten
(74) *Attorney, Agent, or Firm*—Lumen Patent Firm

(57) ABSTRACT

A convex parimutuel call auction implemented at a central market organizer computer includes receiving orders from market participants, calculating a quantity of accepted bids for each of the orders, and communicating to the participants the calculated quantity of accepted bids for each of the orders. Each order includes a specification by a participant of contingent claims on outcomes of a future event, a limit bid price, and a limit bid quantity. The calculation involves maximizing an objective function given by an approximate profit to the market organizer plus a weighted logarithmic penalty function. Because the formulation is convex, the solution may be computed in polynomial time using standard techniques, such as a path-following algorithm.

12 Claims, 3 Drawing Sheets

100 Market is opened to orders from participants

102 Orders are received by central market organizer from participants, where each order includes a specification contingent claims on outcomes of a future event included in the order, a limit bid price, and a limit bid quantity

104 Market closed to new orders

106 Calculation is performed by central market organizer to determine which received orders are accepted and the quantity of bids accepted for each order, using a model that is paramutuel, has a convex formulation, and all bids with a limit price at least as large as a calculated market price are accepted

108 Quantity of accepted bids for each order is communicated to participants

*Fig. 1*

300 Order $j$

302 Specification of claims on future states $i$, $a_{i,j}$

304 Limit bid price, $\pi_j$

306 Limit bid quantity, $q_j$

400 Report $j$

402 Quantity of bids accepted, $x_j$

404 Market price of order, $\Sigma_i\, a_{i,j} p_i$

CONVEX PARIMUTUEL CONTINGENT CLAIM MARKET MECHANISM

CROSS-REFERENCE TO RELATED APPLICATIONS

This application claims priority from U.S. Provisional Patent Application 60/815,661 filed Oct. 12, 2006, which is incorporated herein by reference.

STATEMENT OF GOVERNMENT SPONSORED SUPPORT

This invention was made with Government support under contract DMS-0306611 awarded by NSF. The US Government has certain rights in the invention.

FIELD OF THE INVENTION

The present invention relates to computer-implemented methods for facilitating contingent claim markets. More particularly, it relates to methods that are useful in conducting self-funding, centrally organized contingent claim markets.

BACKGROUND OF THE INVENTION

Financial markets, betting markets and general prediction markets are cases of a centrally organized market where the participants submit bids for contingent claims over the outcome of a future event and the market organizer must determine which bids to accept. In these markets, a bidder selects a set of future states and a price at which he is willing to buy the contingent claims on those states. By accepting a bid on those claims, the market organizer agrees to pay the bidder a fixed amount if one of the bidder's selected states is realized. These markets may be run as call auctions where the organizer holds the auction open until a certain time and then determines the bids to accept and reject.

Centralized organization of a market is useful in instances where the number of traders interested in trading claims over some event is small and there is not a small set of claim formats that everyone is interested in trading. By central organization, we mean that all traders will interact with one market organizer who will conduct trades. The market organizer will issue and guarantee all claims for the market. Without central organization, reasonable liquidity may be difficult to achieve since the cost of making transactions may be high as individual traders may need to conduct several trades to create the specific claim payouts that they desire.

In a centrally organized market, we can think of the traders as making orders to the market organizer. To actually run this type of market, a mechanism is needed to inform the market organizer of which orders to accept and which orders to reject. Many mechanisms are possible, having many different features. When considering potential mechanisms, there are several features that are often desirable. First, it is often valuable to allow market traders to place limit orders. Most actual financial trading includes limit orders where traders express a limit on the price they are willing to pay and/or a limit on the number of shares that they desire. This makes trading more efficient by reducing the number of interactions that the market organizer has with the traders. Secondly, a mechanism typically includes an objective for the market organizer to optimize, e.g., to accept the largest number of orders or to accept the greatest dollar value of orders.

From the individual trader or market participant's point of view, it is often valuable for the market organizer to announce market prices at the time of accepting and rejecting orders. An order's calculated market price is simply the sum of the prices of the individual states that are specified in the order. It is also valuable to the participant if the market organizer agrees to fully accept any order with a limit price greater than or equal to the calculated market price of the order while rejecting any order with a lower limit price. We will refer to this requirement as the price consistency requirement.

There are many available mechanisms to solve this problem. However, only so-called parimutuel mechanisms possess the key characteristic that they are self-funding. In a parimutuel mechanism, the market organizer has no risk of suffering a loss regardless of the outcome of the event in question. A parimutuel mechanism is defined as a mechanism where all the promised payouts to traders are funded exclusively by the accepted orders. The most prevalent use of parimutuel mechanisms is in horse racing betting.

In a traditional parimutuel approach, the market organizer would charge the market participants a fixed amount of money to make an order containing a claim over one particular state. All orders would be accepted. When the market organizer closes the market and one of the states is realized, the total money collected will be divided out to the holders of claims on that state in proportion of the number of orders that they hold (the market organizer could take out his commission before this distribution). This mechanism exposes the market organizer to no risk and has the advantage of accepting all orders. However, one major drawback is that the actual payout to a participant with an order for the realized state will be unknown at the time the participant is placing the order. When the participant's order is accepted, the market organizer could tell her what the payout would be if there were no more orders in the market. However, subsequent orders will change the payouts for realized states. This result does not fit well with the desire of market participants to hold contingent claim securities with known state-dependent payouts.

A limit order parimutuel approach, on the other hand, will pay a predetermined amount to each holder of a bid containing a claim on the realized state, and it allows participants to submit price and quantity limits for their orders. Lange and Economides, in "A parimutuel market microstructure for contingent claims," *European Financial Management*, 11(1):25-49, 2005, have provided a parimutuel market model (PMM) for a contingent claims market that is run by a call auction. The market organizer will receive orders for a period of time until the market is closed. Their mechanism will then determine a market price (or implied price) for an order on each state and determine which orders to accept. The distinction between this mechanism and the traditional parimutuel is that the market organizer guarantees a fixed payout if an order is accepted and one of its specified states is realized. Each market participant will specify a limit price corresponding to the maximum amount she is willing to pay for a contingent claim order. The market organizer will then determine whether to accept their orders and what price to charge.

Despite its many positive characteristics, the Lange and Economides model does not have an efficient computational solution. Specifically, because some of the required constraints of their model are not convex, their model requires special techniques to find the global optimum, and there is no guarantee that those techniques will yield a solution in polynomial time.

On another front, Yang and Ng have recently developed an alternative limit order parimutuel model in their 2003 paper "Qualified-Bound-Pricing methods for combinatorial contract auctions." They have created a linear parimutuel model with a different objective function and a two-stage solution procedure. Their mechanism has many of the same positive characteristics as the Lange and Economides model such as being self-funding, satisfying the price consistency requirement, and providing a guaranteed payout to accepted orders which include the realized state. However, one drawback with this approach is that the solution procedure is iterative and may require one to solve a linear program many times to determine the solution. Another, and perhaps more serious issue is that this model can produce an optimal solution which contains negative state prices.

SUMMARY OF THE INVENTION

The present invention provides novel techniques related to the problem of centrally organizing a market where the participants submit bids for contingent claims over the outcome of a future event and the market organizer must determine which bids to accept. The bidder selects a set of future states and a price at which he is willing to buy the contingent claims. By accepting a bid, the market organizer agrees to pay the bidder a fixed amount if one of the bidder's selected states is realized. More specifically, the invention provides techniques related to markets which are run as call auctions where the organizer holds the auction open until a certain time and then determines the bids to accept and reject. Although a parimutuel mechanism for solving such a market with many positive characteristics is known, its mathematical model is not convex and no efficient algorithm is known to solve it. The present invention provides a new technique called the Convex Parimutuel Call Auction Mechanism (CPCAM) which produces many of the same advantageous properties of the Lange and Economides model but can more easily be solved due to its convexity. In particular, this model yields the first fully polynomial-time approximation scheme (FPTAS) for the problem. Moreover, this model actually produces identical state prices as the Lange and Economides model. Moreover, by first obtaining the state prices from this model, the Lange and Economides model becomes a linear program and hence can be solved in polynomial time.

In one aspect, the present invention provides a method for implementing a call auction at a central market organizer computer. A set of orders submitted via a computer network by a set of market participants is received at the central market organizer computer. Each order includes: i) a specification by a participant of contingent claims on outcomes of a future event upon which the participant is placing a bid, ii) a limit bid price indicating a maximum price the participant is willing to pay for the bid, and iii) a limit quantity indicating a maximum number of bids containing the contingent claims the participant is willing to buy at or below the limit bid price. The central market organizer computer calculates from the received orders a quantity of accepted bids for each of the orders and communicates to the market participants via the computer network the calculated quantity of accepted bids for each of the orders.

The calculation may be performed by maximizing an objective function given by an approximate profit to the market organizer plus a weighted logarithmic penalty function. More specifically, the calculation may be performed by computing $x_j$ for each j by executing an algorithm that maximizes $$\Sigma_j \pi_j x_j - Mw + \Sigma_i \theta_i \log s_i$$

subject to the constraints $M = \Sigma_j a_{i,j} x_j + s_i$ for all i, $0 \leq x_j \leq q_j$ for all j, $s_i \geq 0$ for all i, where i is an index over all states, i.e., all outcomes of future events (ranges from 1 to S), j is an index over all orders submitted by participants (ranges from 1 to n), w is a pay-out price to be paid by the market organizer for each accepted bid containing a state that is realized (without loss of generality, w may be set to 1), $\pi_j$ is a participant's limit bid price of order j based on the received set of orders, $q_j$ is a participant's limit bid quantity of order j based on the received set of orders, $a_{i,j}$ is a participant's specification whether or not participant's order j includes a contingent claim on the realization state i, i.e., its value is 1 or 0 depending on whether or not the participant's bid includes a contingent claim on the realization of state i, $\theta_i$ is a market organizer's starting price of state i, i.e., the vector θ is a starting order, $x_j$ is a market organizer's computed quantity of bids accepted for order j, $s_i$ is a non-negative slack or dummy variable, and M approximates (not equal because of $s_i$) a worst-case number of winning bids that the market organizer will need to pay on.

The market organizer may also compute a market price $p_i$ for each state and the computation is performed such that every bid is accepted whose limit price is greater than or equal to the computed market price of the order. The computation guarantees that the market organizer will not have to pay out to participants with winning bids an amount greater than the amount collected from the participants to buy the accepted bids, i.e., all payouts to participants are funded by the accepted orders. Such a market is called paramutuel. Because the formulation is convex, the solution (up to any prescribed accuracy) may be computed in polynomial time using standard techniques. For example, the price vector may be computed efficiently using a path-following algorithm.

The starting order may be selected by the market organizer in whole or in part based on information or preferences received from the participants.

Each participant pays the market organizer an amount equal to their specified limit price for each accepted bid. After an outcome of the future event is realized, for each accepted bid that contains the realized state, the market organizer pays the predetermined amount w to the participant holding the bid.

BRIEF DESCRIPTION OF THE DRAWINGS

FIG. 1 is a flow chart outlining stages of a computer-implemented method for facilitating a contingent claim market, according to an embodiment of the invention.

DETAILED DESCRIPTION

The present invention provides a computer-implemented method for centrally organizing a contingent claim market. The method is based on a new model called the Convex Parimutuel Call Auction Mechanism (CPCAM). We utilize the limit order structure to ensure market participants will know with certainty their payout if their order is accepted and one of their specified states is realized. This model is parimutuel (i.e., self-funding), satisfies the price consistency requirement, and produces unique state prices. In addition, this model has the significant advantage that is a convex formulation of the parimutuel call auction mechanism. This results in the first fully polynomial-time approximation scheme (FPTAS) for the problem, which can be efficiently computed, for example, using the path-following algorithm described in Y. Ye, "A path to the Arrow-Debreu competitive market equilibrium," *Mathematical Programming*, 2005. Thus, the CPCAM provides an easy-to-solve mechanism that is used in the present invention to run contingent claim markets. The mechanism is attractive to market organizers due to its solvability and the parimutuel property. Market participants will value the certainty of payouts, the low transaction costs (they merely need to submit a limit order for their desired claim), and the fact that price consistency restrictions are satisfied.

Figure 2A:
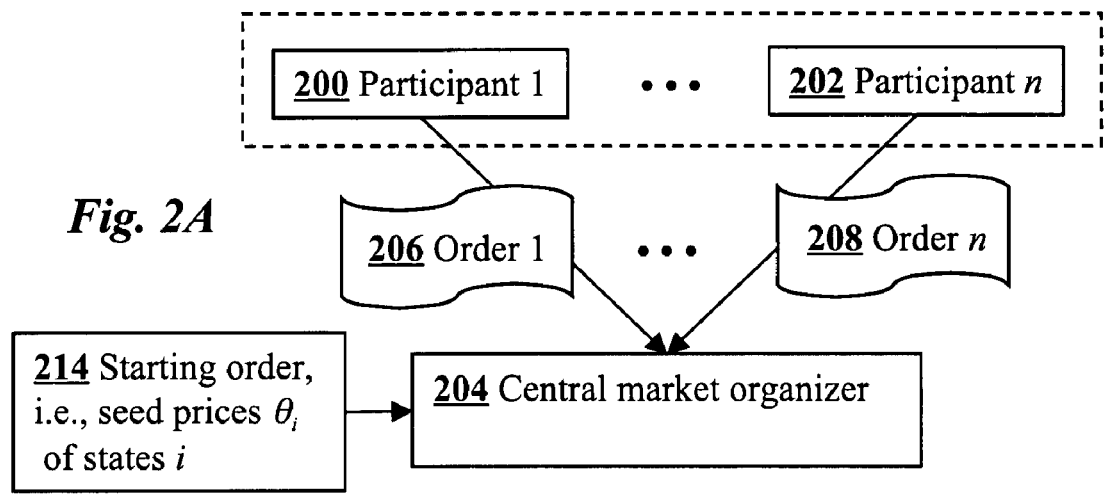
FIG. 2A is a block diagram illustrating the submission of orders from participants to a central market organizer, according to an embodiment of the invention.
Figure 3:
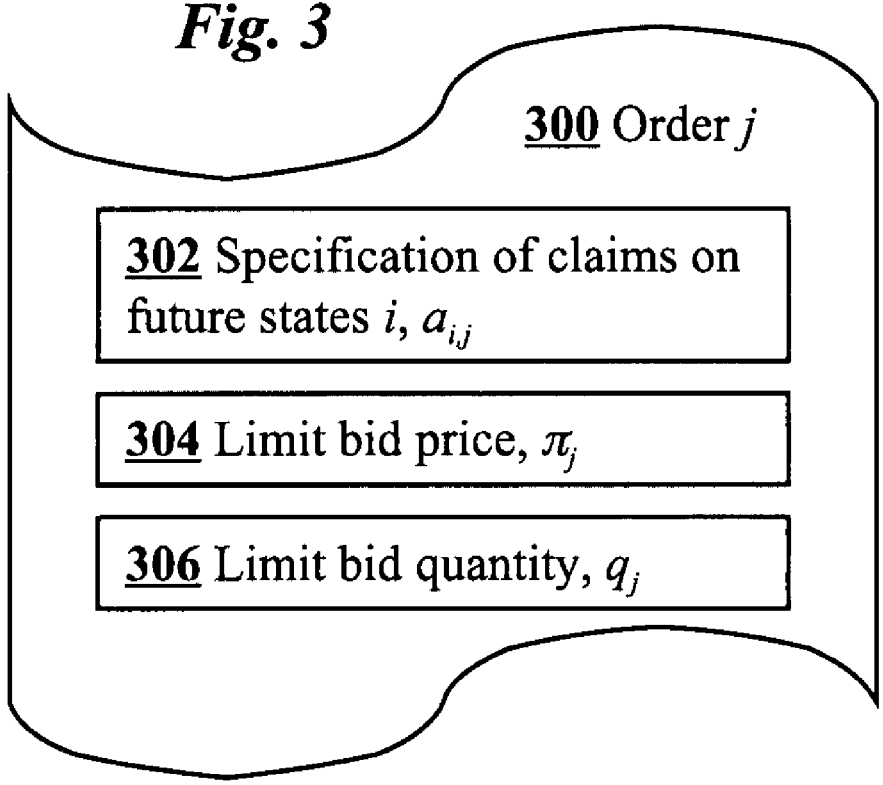
FIG. 3 is a block diagram illustrating components of an order, according to an embodiment of the invention.

FIG. 1 is a flow chart outlining stages of a computer-implemented method for facilitating a contingent claim market, according to an embodiment of the invention. In step 100 the market is opened by the central organizer to receiving market orders from participants. A set of outcomes of a future event and a payout price per winning bid is determined by the central organizer at or before opening. In step 102 the orders are received by the central market organizer. FIG. 2A is a block diagram illustrating the submission of orders from participants to a central market organizer. Participants, such as participants 200 and 202, submit orders 206 and 208, respectively, to central market organizer 204. As illustrated in FIG. 3, each order 300 includes a specification 302 by a participant of contingent claims on outcomes of a future event (or state) that the participant is bidding on in the order. Each order 300 also includes a limit bid price 304 and a limit bid quantity 306. Returning now to the flowchart of FIG. 1, in step 104 the central organizer closes the market, i.e., orders from participants received after closing will no longer be considered by the central organizer. In step 106 the central organizer performs a calculation based on the information contained in the collection of received orders. The calculation determines which received orders are accepted and the quantity of bids accepted for each order. The calculation is performed using a model that is paramutuel, convex, and satisfies the price consistency restriction, i.e., any bid with a limit price at least as large as a calculated market price for the bid is accepted. In step 108, the quantity of accepted bids (which is zero for bids that are not accepted) is communicated to the participants.

Figure 2B:
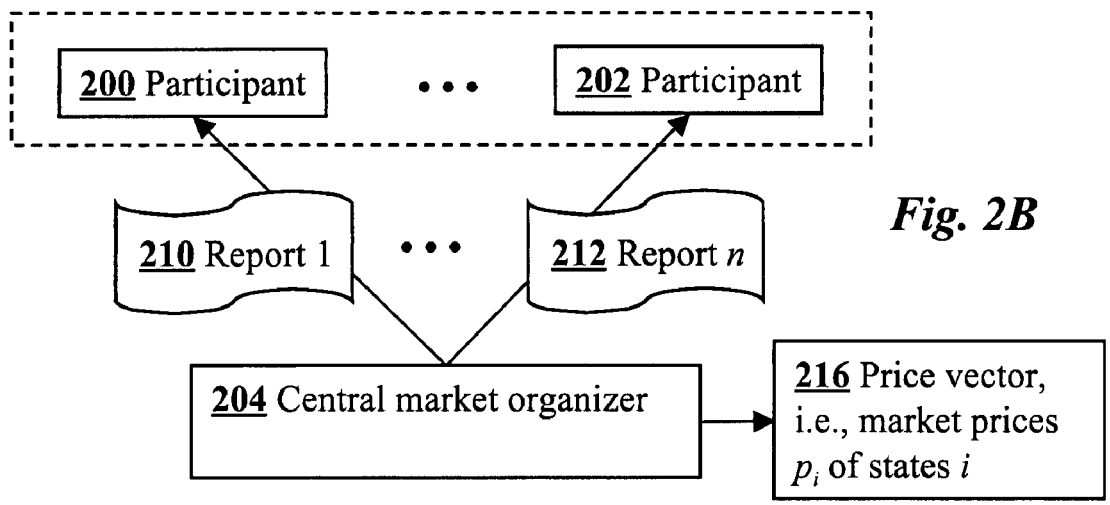
FIG. 2B is a block diagram illustrating the transmission of reports from a central market organizer to participants, according to an embodiment of the invention.
Figure 4:
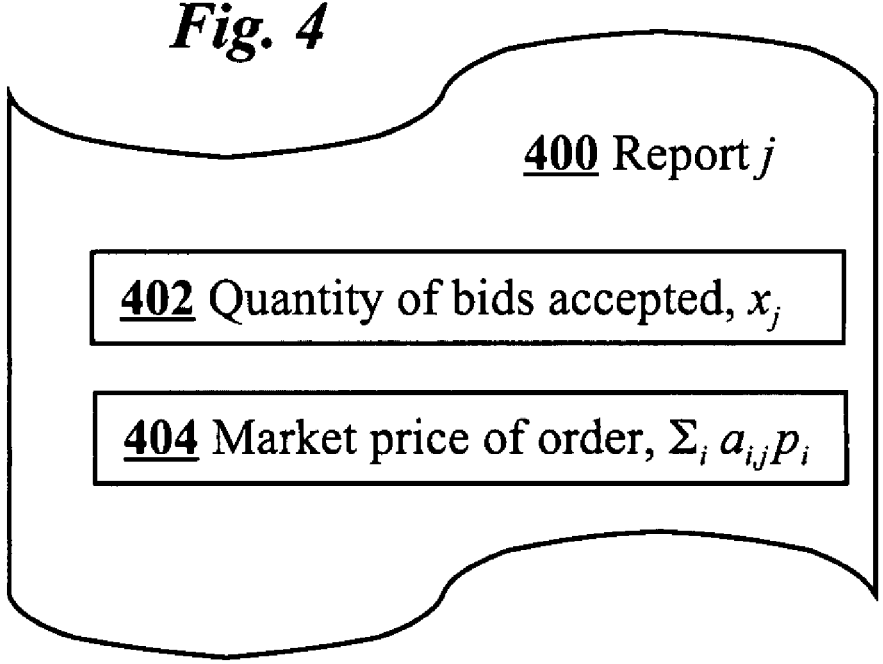
FIG. 4 is a block diagram illustrating components of a report, according to an embodiment of the invention.

FIG. 2B is a block diagram illustrating the transmission of reports 210 and 212 from the central market organizer 204 to participants 200 and 202, respectively. As shown in FIG. 4, each report 400 contains a quantity 402 of bids accepted. The report may also include additional information such as the price the participants need to pay for their bid. This price may be the computed market price 404. This price could alternatively be the participant's limit price, or any price in the computed market price and the limit price. When an actual outcome or state of the future event is realized, the central organizer pays (or instructs another to pay) an amount w for each bid containing a claim on the realized state to the participant holding the bid.

Figure 2C:
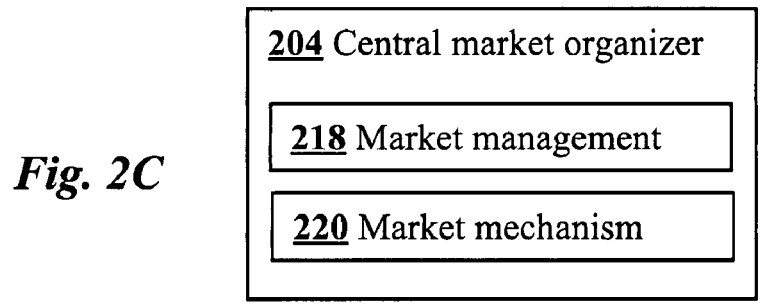
FIG. 2C is a block diagram illustrating components of a central market organizer, according to an embodiment of the invention.

As illustrated in FIG. 2C, the central market organizer 204 may include a market management component 218, which manages the opening and closing of the market, receiving of orders from participants, and sending of reports to the participants. A market mechanism component 220 performs the computation to determine the quantity of each bid to accept based on the CPCAM model. The market management component 218 and the market mechanism component 220 may be implemented on the same computer system, or on separate computer systems in communication.

The details of the computation performed by the market mechanism component 220 will now be described using the following nomenclature. The model pertains to a market with a central organizer and n participants (not necessarily distinct) who submit n market orders to the central organizer. The participants and their corresponding orders and bids are indexed by j. At market opening, there are S predetermined states of the world (or outcomes) in the future on which each market participant submits a bid for contingent claims on these states. These states, outcomes, and corresponding claims on outcomes are indexed by i. The variable $a_{i,j}$ is used to denote a participant's specification as to whether or not participant's order j includes a contingent claim on the realization state i, i.e., the value of $a_{i,j}$ is 1 or 0 depending on whether or not the participant's bid includes a contingent claim on the realization of state i. For each bid that is accepted by the organizer and contains the realized future state, the organizer will pay the participant some predetermined amount w, which, without loss of generality, equals 1 in this description. In practice, w may be set to any desired amount. A participant's order j also includes a limit bid price, denoted $\pi_j$, indicating a maximum price that the participant is willing to pay for each bid, and a limit bid quantity, denoted $q_j$, indicating a maximum number of such bids the participant is willing to buy. Although the method is described with each participant submitting exactly one order, because the participants are not necessarily distinct from each other, the method also applies to the special case where some of the participants are identical, in which case the method allows a single participant to submit multiple distinct orders.

After receiving all orders from the participants, i.e., upon market close, the central market organizer calculates, for each order j, a quantity of accepted bids for that order, denoted $x_j$. In general, this quantity is always non-negative and no larger than the limit quantity, i.e., $0 \leq x_j \leq q_j$. If $x_j=0$, then the order is not accepted. If $x_j>0$, then the order is accepted and filled. The participant pays the limit bid price $\pi_j$ for each accepted bid. Thus, the total price paid for order j is $x_j \pi_j$. If order j contains a claim on state i, and state i is realized, then the participant is paid w for each of the accepted bids, i.e., a total of $x_j w$.

The market organizer may also compute a market price $p_i$ for each state (i.e., a price vector p). Consequently, the market price of an order j is equal to $\Sigma_i a_{i,j} p_i$. The computation is performed such that the price consistency constraint is satisfied, i.e., every bid is accepted whose limit price is greater than or equal to the computed market price of the order. In other words, if $\pi_j \leq \Sigma_i a_{i,j} p_i$, then $x_j > 0$. As shown in FIG. 2B, the central market organizer may publish, announce, communicate, or otherwise make available to participants the price vector 216 which includes the computed market price $p_i$ of each state i. Instead or in addition to the computed market price, the market organizer may announce the prices the participants need to pay for their bids.

The input to the calculation includes, for each order j, the values $a_{i,j}$ for each state i, the value $\pi_j$ and the value $q_j$. These values are obtained from the participants. The input also includes values $\theta_i$ for each state i. The value $\theta_i$ is a starting price of state i, i.e., the vector $\theta$ is a starting order. It may be selected by the market organizer with or without regard to information or preferences provided by the participants. The values of $a_{i,j}$ for all i and j may be represented by an S-by-n matrix, A. The values of $\pi_j$ for all j may be represented by an n-dimensional vector $\pi$, and the values of $q_j$ for all j may be represented by an n-dimensional vector, q. Based on this information, the market organizer determines the values of $x_j$ for all j (i.e., the n-dimensional vector, x) and the values of $p_i$ for all i (i.e., the S-dimensional price vector, p).

The computation should ensure the market is self-funding, should satisfy the price consistency requirement, and should not exceed limit price or limit quantity on any filled order. In addition, in order for the computation to be performed efficiently, the model should be convex. Surprisingly, the inventors have discovered a model that, for the first time, satisfies all these criteria. Specifically, the model maximizes an objective function, $\Sigma_j \pi_j x_j - Mw + \Sigma_i \theta_i \log s_i$ subject to the constraints $M = \Sigma_j a_{i,j} x_j + s_i$ for all i, $0 \leq x_j \leq q_j$ for all j, $s_i \geq 0$ for all i, The objective function in this formulation has the following interpretation. First, recall that $\theta$ is the vector of starting orders. Now, the term $\Sigma_j \pi_j x_j - Mw$ is the profit for the market organizer. On the other hand, the term $\Sigma_i \theta_i \log s_i = \Sigma_i \theta_i \log(M - \Sigma_j a_{i,j} x_j)$ can be viewed as a disutility function (or weighted logarithmic penalty function) for the market organizer that ensures she will find an allocation of accepted orders that is parimutuel. Thus, intuitively, the model is trying to maximize the profit of the market organizer while remaining parimutuel.

This model is a convex program because the logarithmic function is concave and the constraints are linear. Consequently, it can be solved (up to any prescribed accuracy) in polynomial time using standard techniques. It may be noted that the optimal solution satisfies $\Sigma_i p_i = w$.

It can be demonstrated that this model creates a self-funding market, satisfies the price consistency constraints, and produces a unique price vector. In addition, it can be shown that the price vector solution to the model remains optimal if we charge the participants the calculated state price of their orders instead of their limit price. Thus, in some embodiments, the market organizer may charge a participant any price between the calculated market price for their bid and the participant's limit price, inclusive.

In addition, it can be shown that, for any given starting order $\theta$, there is a unique limit to the state price vector p as each component $\theta_i$ is reduced to zero by the same factor. In essence, the market organizer needs to seed the market with these starting orders to guarantee the uniqueness of the optimal state price vector. However, the market organizer could actually lose this seed money in some outcomes. In practice, we can set the starting orders to be very small so that this is not an issue. On the other hand, it is natural to ask whether the starting orders can be removed altogether from the model by taking them to be arbitrarily small. In fact, this is indeed possible.

For each starting order $\theta$, there is a unique state price vector p. Now, imagine that we set the starting order to be equal to $\mu\theta$, with $0 < \mu < 1$. Now, it can be shown that, as $\mu$ approaches zero, the state price vector p will converge to a unique limit. This allows us to effectively eliminate the starting orders by selecting $\mu$ to be arbitrarily small. The model will still yield a unique price vector p such that the market is self-funding and the prices are consistent. Moreover, such a p can be computed efficiently using the path-following algorithm.

Even if $\mu$ is selected to be arbitrarily small, the selection of $\theta$ still impacts the limiting solution. For example, two different $\theta$ vectors can result in different state price vectors p although the allocations x are the same. One can view the entries of the $\theta$ vector as relative weights assigned to each state, and the limiting state prices will depend only on the relative proportions between these weights and not on their absolute magnitudes. This gives the market organizer additional flexibility in her pricing, as she is free to choose the $\theta$ vector. In addition, the allocation x will be optimal in any case. This is an important fact for the market organizer since the allocations are important to her as they determine her outcomes. She does not necessarily care about what the state prices are.

It is relevant to note that the set of feasible solutions of the PMM model coincides with the set of optimal solutions of the CPCAM model and they produce the identical state price vector. Furthermore, the PMM model can be solved as a linear program after obtaining the optimal state price vector p from the CPCAM model.

It is also important to note that the prices computed by the CPCAM model will be non-negative.

To illustrate the operation of the CPCAM method using a simple example, consider a hypothetical limit order call auction in which participants submit orders containing claims on the outcome of the Superbowl. At the time the auction is run, suppose there are eight teams remaining in the playoffs: Atlanta, Indianapolis, Minnesota, New England, New York Jets, Philadelphia, Pittsburgh and St. Louis. If a bid is accepted, the participant pays its limit price. If a participant has a bid accepted which contains a claim on the winning team, they are awarded one dollar. During the course of the auction, participants submitted a total of 4,375 orders. After solving the CPCAM model, the following state prices were calculated:

TABLE 1

| Team | Price |
|---|---|
| Atlanta | 0.001 |
| Indianapolis | 0.045 |
| Minnesota | 0.002 |
| New England | 0.400 |
| New York Jets | 0.001 |
| Philadelphia | 0.049 |
| Pittsburgh | 0.500 |
| St. Louis | 0.002 |

Of the 4,375 submitted orders, 1,980 of these orders had limit prices at or above the bid state price, and were accepted.

The CPCAM is a valuable mechanism for centrally organizing contingent claim markets. It possesses many characteristics that are beneficial to both market organizers and market participants. It is interesting to note that, while the mechanism will produce unique state prices p, the order fills x are not unique in general. Thus, there are some degrees of freedom concerning how to allocate order fills when market participants submit orders whose calculated state price is equal to their limit price. Thus, some embodiments of the invention may include a set of order fill preference rules to ensure a unique solution for order fills. Examples include filling earliest orders first, and giving preference to the largest orders.

In real market situations, market participants may want to submit different types of orders to create hedged positions. However, to ensure proper hedging, the participant will want to make sure that different orders are accepted in some appropriate proportion. We can easily allow this type of conditional order specification in the CPCAM formulation. For example, if a market participant had submitted two separate order types but wanted the number of accepted orders of the first type to be no larger than twice the number of accepted orders of the second type, we could simply introduce the linear constraint $x_1 \leq 2x_2$ into the model. The convexity of the model would be retained and we could easily solve it. Such flexibility of the CPCAM could be of great use to market participants.

It is also significant to note the advantages of the CPCAM model over the Qualified-Bound-Pricing model of Yang and Ng. First, the CPCAM can be solved in one step. Secondly, it appears that the Yang and Ng formulation is only self-funding if the participants are charged their limit prices instead of the calculated state prices for their bids. The CPCAM is self-funding (with the exception of the starting orders) for any price charged to participants that is greater than or equal to the calculated state prices. Note that the limit prices for accepted bids will always be greater than or equal to the calculated state prices.

In addition, the Yang and Ng model can lead to negative state prices which is not desirable. Negative state prices could be confusing to market participants because it could be interpreted to mean that they would actually be paid if they had submitted an order for a particular state while still holding a claim for a payment if that state were realized. However, by removing the restriction that the state prices must be non-negative, the market organizer may be able to accept more orders and thus create a more liquid market. The market may suffer because the market organizer may choose not to announce state prices to avoid confusion but the market may actually function more effectively.

The invention claimed is:

1. A method for implementing a call auction by a central market organizer computer, the method comprising:
    a) receiving by the central market organizer computer a set of orders submitted by a set of market participants;
    b) calculating by the central market organizer computer from the received orders a quantity of accepted bids for each of the orders; and
    c) communicating by the central market organizer computer to the market participants the calculated quantity of accepted bids for each of the orders;
    wherein each order includes: i) a specification by a participant of contingent claims on outcomes of a future event upon which the participant is placing a bid, ii) a limit bid price indicating a maximum price the participant is willing to pay for the bid, and iii) a limit quantity indicating a maximum number of bids containing the contingent claims the participant is willing to buy at or below the limit bid price;
    wherein calculating by the central market organizer computer the quantity of accepted bids for each of the orders received by the central market organizer computer comprises maximizing an objective function given by an approximate profit to the market organizer plus a weighted logarithmic penalty function.

2. The method of claim 1 wherein calculating the quantity of accepted bids for each of the orders comprises computing $x_j$ for each j by executing an algorithm that maximizes $$\Sigma_j \pi_j x_j - Mw + \Sigma_i \theta_i \log s_i$$

subject to the constraints $$M = \Sigma_j a_{i,j} x_j + s_i \text{ for all } i,$$

$$0 \leq x_j \leq q_j \text{ for all } j,$$

$$s_i \geq 0 \text{ for all } i,$$

where
   i is an index over all states, i.e., all outcomes of future events (ranges from 1 to S),
   j is an index over all orders submitted by participants (ranges from 1 to n),
   w is a pay-out price to be paid by the market organizer for each accepted bid containing a state that is realized (without loss of generality, w may be set to 1),
   $\pi_j$ is a participant's limit bid price of order j based on the received set of orders,
   $q_j$ is a participant's limit bid quantity of order j based on the received set of orders,
   $a_{i,j}$ is a participant's specification whether or not participant's order j includes a contingent claim on the realization state i, i.e., its value is 1 or 0 depending on whether or not the participant's bid includes a contingent claim on the realization of state i,
   $\theta_i$ is a market organizer's starting price of state i, i.e., the vector $\theta$ is a starting order,
   $x_j$ is a market organizer's computed quantity of bids accepted for order j,
   $s_i$ is a non-negative slack or dummy variable,
and
   M approximates (not equal because of $s_i$) a worst-case number of winning bids that the market organizer will need to pay on.

3. The method of claim 1 wherein calculating the quantity of accepted bids for each of the orders comprises computing a market price $p_i$ for each state i.

4. The method of claim 1 wherein every bid is accepted whose limit price is greater than or equal to a computed market price of the order.

5. The method of claim 1 wherein calculating the quantity of accepted bids for each of the orders comprises performing a computation based on a model that is paramutuel.

6. The method of claim 1 wherein calculating the quantity of accepted bids for each of the orders comprises performing a computation based on a model that is convex.

7. The method of claim 1 wherein calculating the quantity of accepted bids for each of the orders comprises performing a computation using a path-following algorithm.

8. The method of claim 1 wherein calculating the quantity of accepted bids for each of the orders comprises constraining the calculated quantity in accordance with a linear constraint selected by a participant.

9. The method of claim 1 further comprising selecting a starting order by selecting relative proportions between components of the starting order, and wherein calculating the quantity of accepted bids for each of the orders is based on the selected starting order.

10. The method of claim 1 further comprising, for each order, charging the participant the limit price for each of the accepted bids.

11. The method of claim 1 further comprising, for each order, charging the participant a price between the limit price and a computed market price for each of the accepted bids.

12. The method of claim 1 further comprising, for each order, if the, order includes an accepted bid including a contingent claim on a realized outcome of the future event, paying a predetermined amount w to the participant.

* * * * *